(12) United States Patent
Howes et al.

(10) Patent No.: US 11,047,583 B2
(45) Date of Patent: Jun. 29, 2021

(54) ZONED RADIANT HEATING SYSTEM AND METHOD

(71) Applicant: Schneider Electric Controls UK Limited, Plymouth (GB)

(72) Inventors: Ryan Howes, Plymouth (GB); David Kempster, Torpoint (GB); Mikael Eliaeson, Exeter (GB); Jan Bunes, Plymouth (GB)

(73) Assignee: Schneider Electric Controls UK Limited

( * ) Notice: Subject to any disclaimer, the term of this patent is extended or adjusted under 35 U.S.C. 154(b) by 834 days.

(21) Appl. No.: 15/807,747

(22) Filed: Nov. 9, 2017

(65) Prior Publication Data

US 2018/0128499 A1 May 10, 2018

Related U.S. Application Data

(60) Provisional application No. 62/419,665, filed on Nov. 9, 2016.

(51) Int. Cl.
*F24D 19/10* (2006.01)
*G05D 23/19* (2006.01)
(Continued)

(52) U.S. Cl.
CPC ........... *F24D 19/1018* (2013.01); *F24D 3/02* (2013.01); *F24D 3/08* (2013.01); *F24D 19/1066* (2013.01);
(Continued)

(58) Field of Classification Search
CPC ............. F24D 19/1018; F24D 19/1066; F24D 19/0073; F24D 3/02; F24D 3/08;
(Continued)

(56) References Cited

U.S. PATENT DOCUMENTS 2,344,991 A 3/1944 Lilja
3,134,542 A 5/1964 Smith
(Continued)

FOREIGN PATENT DOCUMENTS

DE 2800704 A1 * 7/1979 ......... G05D 23/1905
DE 3643434 A1 6/1988
(Continued)

OTHER PUBLICATIONS

"DE_3643434_A1—Machine Translation.pdf", machine translation, EPO.org, Aug. 28, 2020. (Year: 2020).*
(Continued)

*Primary Examiner* — Daniel E. Namay
(74) *Attorney, Agent, or Firm* — Stinson LLP

(57) ABSTRACT

A heating fluid control system determines the aggregated demand for heating fluid from a plurality of sources of demand in a building and deactivates a boiler that provides the heating fluid when the aggregated demand is zero. The sources of demand can include radiators and domestic hot water fixtures. Valves that control the flow of heating fluid from the boiler to these sources of demand can transmit signals representative of the position of the valve. A controller can use these signals and other signals to determine the demand for heating fluid from each source of demand. The controller evaluates the signals to determine the aggregate system demand. And after deactivating the boiler, the controller can reactivate the boiler when the aggregate system demand is determined to be non-zero. Methods of using such heating systems are also disclosed.

18 Claims, 4 Drawing Sheets

(51) Int. Cl.
*G05D 23/20* (2006.01)
*F24D 3/02* (2006.01)
*F24D 3/08* (2006.01)

(52) U.S. Cl.
CPC ..... *G05D 23/1902* (2013.01); *G05D 23/2039* (2013.01); *F24D 2220/003* (2013.01); *F24D 2220/0257* (2013.01); *G05D 23/19* (2013.01)

(58) Field of Classification Search
CPC ........ F24D 2220/003; F24D 2220/042; G05D 23/19; G05D 23/1902; G05D 23/1917; G05D 23/2039; G01K 13/08
USPC .................................................. 237/8 A, 2 A
See application file for complete search history.

(56) References Cited

U.S. PATENT DOCUMENTS

| | | | |
|---|---|---|---|
| 5,779,143 A * | 7/1998 | Michaud ............. | F24D 19/1009 237/56 |
| 8,630,741 B1 | 1/2014 | Matsuoka et al. | |
| 8,659,302 B1 | 2/2014 | Warren et al. | |
| 8,935,110 B2 | 1/2015 | Hsieh et al. | |
| 9,568,201 B2 | 2/2017 | Fadell et al. | |
| 9,791,839 B2 | 10/2017 | Matsuoka et al. | |
| 9,791,871 B1 | 10/2017 | Marschalkowski et al. | |
| 2002/0119003 A1 | 8/2002 | Buschatz et al. | |
| 2006/0279238 A1 | 12/2006 | Lendi et al. | |
| 2007/0158442 A1 | 7/2007 | Chapman, Jr. et al. | |
| 2008/0068354 A1 | 3/2008 | Aimi et al. | |
| 2010/0045440 A1 | 2/2010 | Araiza | |
| 2010/0045470 A1 | 2/2010 | Araiza et al. | |
| 2010/0258194 A1 | 10/2010 | Kim | |
| 2010/0270385 A1 | 10/2010 | Kim | |
| 2011/0233290 A1 | 9/2011 | Borovinov | |
| 2012/0130547 A1 | 5/2012 | Fadell et al. | |
| 2012/0203379 A1 | 8/2012 | Sloo et al. | |
| 2012/0310373 A1 * | 12/2012 | Karaffa ............... | G05B 19/4186 700/11 |
| 2013/0025301 A1 | 1/2013 | Maitani et al. | |
| 2013/0048745 A1 | 2/2013 | Johnson, Jr. et al. | |
| 2013/0056543 A1 | 3/2013 | Olivotti et al. | |
| 2013/0081799 A1 | 4/2013 | Loblich et al. | |
| 2013/0099009 A1 | 4/2013 | Filson et al. | |
| 2013/0204440 A1 * | 8/2013 | Fadell ................... | G05B 15/02 700/276 |
| 2013/0204442 A1 * | 8/2013 | Modi ..................... | G05B 15/02 700/278 |
| 2013/0218351 A1 | 8/2013 | Warren et al. | |
| 2013/0221117 A1 | 8/2013 | Warren et al. | |
| 2013/0240172 A1 | 9/2013 | Reilly et al. | |
| 2014/0319232 A1 | 10/2014 | Gourlay et al. | |
| 2014/0326796 A1 | 11/2014 | Kymissis et al. | |
| 2015/0102120 A1 | 4/2015 | Sorensen et al. | |
| 2015/0276237 A1 | 10/2015 | Daniels et al. | |
| 2015/0276238 A1 | 10/2015 | Matsuoka et al. | |
| 2015/0276239 A1 | 10/2015 | Fadell et al. | |
| 2017/0059196 A1 | 3/2017 | Stefanski et al. | |
| 2017/0060149 A1 | 3/2017 | Giustina et al. | |
| 2017/0060150 A1 * | 3/2017 | Stefanski ............. | G01V 8/10 |
| 2017/0211821 A1 * | 7/2017 | Hardesty .............. | F22D 5/34 |
| 2018/0058705 A1 | 3/2018 | Ha et al. | |
| 2018/0128500 A1 * | 5/2018 | Howes ................. | F24D 19/1018 |
| 2018/0128501 A1 * | 5/2018 | Howes ................. | F24D 19/1018 |
| 2018/0336775 A1 | 11/2018 | Callemo et al. | |
| 2019/0346153 A1 | 11/2019 | Morita et al. | |
| 2020/0256575 A1 * | 8/2020 | Nelson ................. | F24F 11/30 |

FOREIGN PATENT DOCUMENTS

| | | | | |
|---|---|---|---|---|
| DE | 102011018698 A1 | 10/2012 | | |
| EP | 0282255 A2 | 9/1988 | | |
| EP | 1156285 A2 | 11/2001 | | |
| EP | 2114015 A1 | 11/2009 | | |
| EP | 2144015 A2 | 1/2010 | | |
| EP | 2530549 A2 | 12/2012 | | |
| EP | 2857921 A1 * | 4/2015 | ......... | G05D 23/1934 |
| EP | 2857921 A1 | 4/2015 | | |
| GB | 2161292 A | 1/1986 | | |
| GB | 2464095 A | 4/2010 | | |
| GB | 2477860 A | 8/2011 | | |
| WO | 2009/072744 A2 | 6/2009 | | |
| WO | WO2009072744 A2 | 6/2009 | | |
| WO | 2012/068503 A1 | 5/2012 | | |
| WO | WO20120685503 A1 | 5/2012 | | |
| WO | 2012/146323 A3 | 11/2012 | | |

OTHER PUBLICATIONS

"DE_102011018698_A1_H—Machine Translation.pdf", machine translation, EPO.org, Aug. 28, 2020. (Year: 2020).*
Extended European Search Report for 17197502.2, dated Feb. 12, 2018 (8 pages).
European Search Report for application No. EP17200549.8 dated Mar. 20, 2018, 10 pgs.

* cited by examiner

ZONED RADIANT HEATING SYSTEM AND METHOD

CROSS-REFERENCE TO RELATED APPLICATIONS

This application claims priority to U.S. Provisional Patent Application Ser. No. 62/419,665, filed Nov. 9, 2016 and entitled ZONED RADIANT HEATING SYSTEM AND METHOD, which is hereby incorporated by reference in its entirety.

TECHNICAL FIELD

The present disclosure generally relates to a radiant heating system for heating multiple zones in a building and more specifically to a radiant heating system using zoned electronic thermostatic radiator valves that communicate with a system controller.

BACKGROUND

Radiant heating systems include a central heater that is thermally coupled to radiators distributed in different zones of a building. In a conventional radiant heating system, radiators are positioned in different rooms in a residential structure and are operatively coupled to a central boiler. Hot water from the boiler is fed to the radiators to radiantly heat the respective rooms. In a zoned radiant heating system, each radiator is operatively connected to a respective thermostatic valve that opens and closes to control the flow of hot water into the radiator based on the environmental temperature in the respective zone. Traditional thermostatic valves comprise wax motors that open and close due to thermal expansion of a wax material driven by changes in environmental temperature. No other power source is required to open and close the valve. However, because conventional wax valves are only passively responsive to changes in environmental temperature, they are not suitable for centralized system control.

To provide some degree of centralized control to a zoned radiant heating system, electronic thermostatic radiator valves are used instead of wax motors. Unlike wax motors, electronic thermostatic radiator valves have valve positioners that must be powered to open and close the valve. But the thermostatic radiator valves are capable of communicating with a system controller that can control all of the valves to implement a coordinated control scheme to achieve the desired objectives for the system.

SUMMARY

Aspects of the disclosure relate to heating fluid control systems and methods of controlling a boiler that selectively activate and deactivate the boiler based on an aggregation of system-wide demand for heating fluid from the boiler. For example, the systems and methods can consider aggregated system demand from sources of demand such as radiators, domestic hot water sources, etc., based on indications of demand such as signals representative of radiator valve position, domestic hot water valve position, room temperature, etc.

In one aspect, a heating fluid control system is used for a building. The building comprises a boiler configured to heat heating fluid and sources of demand configured to use the heating fluid from the boiler. The sources of demand include at least one radiator in each of a plurality of zones of the building configured to radiantly heat the respective zone using heat of the heating fluid. The heating fluid control system comprises at least one radiator valve for each of the plurality of zones. Each radiator valve is fluidly connected between a radiator in the respective zone and the boiler and is selectively openable and closable to control the heating fluid that is supplied to the respective radiator from the boiler. Each radiator valve is further configured to transmit a radiator demand signal representative of a demand of the respective radiator for the heating fluid. A controller is operatively connected to the boiler and to each of the radiator valves to receive the respective radiator demand signal. The controller is configured to determine, based at least in part on the radiator demand signals for each of the radiator valves, when a demand for heating fluid from the sources of demand of the building is zero and to transmit a boiler deactivation control signal to the boiler when the demand for heating fluid from the sources of demand is determined to be zero. The boiler deactivation control signal is configured to automatically deactivate the boiler when the boiler receives the boiler deactivation signal.

In another aspect, a method of providing separately controlled heating of a plurality of zones in a building comprises receiving a demand signal from a at least one source of demand for each of the plurality of zones. Each demand signal represents a demand for hot water in the respective zone. The demand signals are combined to determine an aggregated hot water demand having one of a zero value representative of zero hot water demand and a non-zero representative of non-zero hot water demand. The boiler is selectively deactivated when the aggregated hot water demand is determined to have a zero value.

In still another aspect, a heating fluid control system is used for a building. The building comprises a boiler configured draw power from a power source to heat heating fluid and a plurality of sources of demand configured to use the heating fluid from the boiler. The heating fluid control system comprises a plurality of valves fluidly connected between the boiler and the plurality of sources of demand. Each of the valves is selectively openable and closable to control the heating fluid that is supplied from the boiler to at least one of the respective sources of demand. Each of the valves is further configured to transmit a valve condition signal representing whether the valve is open or closed. A controller is operatively connected to each of the valves to receive the respective valve condition signal and is configured to determine based at least in part on the received valve condition signals when the heating fluid control system has zero aggregate demand for heating fluid. The controller is further configured to automatically adjust the boiler to limit the power drawn from the power source when the controller determines that the heating fluid control system has zero aggregate demand for heating fluid.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
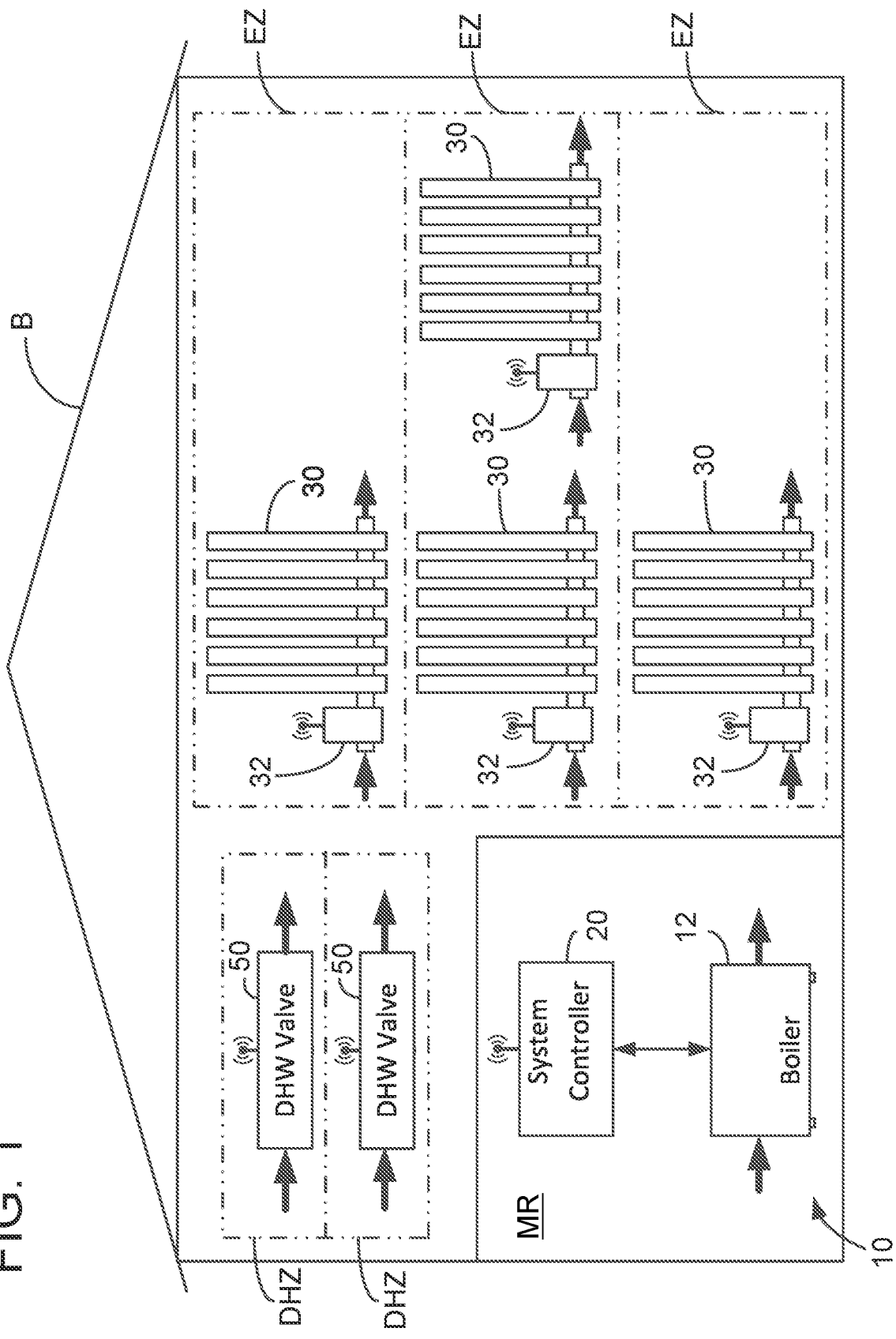
FIG. 1 is a schematic diagram of a zoned radiant heating system.

Referring to FIG. 1, a radiant heating system for providing separately controlled heating of a plurality of environmental zones EZ in a building B is generally indicated at 10. As will be explained in further detail below, the illustrated system 10 implements a centralized control scheme that can be used to enhance energy efficiency when heating the building B. In addition, the system 10 implements control features that reduce the frequency with which a user must undertake routine maintenance tasks to enhance the overall user experience with the system. Below, the major components of the radiant heating system 10 are described in detail before describing certain exemplary implementations of the centralized control scheme.

The system 10 includes a boiler 12 that is fluidly connected to a water supply (not shown). In the illustrated embodiment, the boiler 12 is positioned in a mechanical room MR of the building B, but the boiler can be positioned in any suitable location without departing from the scope of the invention. In the drawings, the flow of water into and out of various components of the system 10, such as the boiler 12, is represented schematically by bold arrows. For clarity, however, FIG. 1 does not illustrate the interconnecting plumbing for the entire system. But one skilled in the art would readily understand how to interconnect the components of the system 10 through conventional plumbing techniques. The boiler 12 is configured to heat water and to supply hot water (broadly, a heating fluid) to various peripheral components of the system 10. As explained below, the boiler 12 is operatively connected to a controller 20 that is configured to send control instructions to the boiler and to determine an operating state of the boiler that the controller uses to control other aspects of the system 10.

Figure 2:
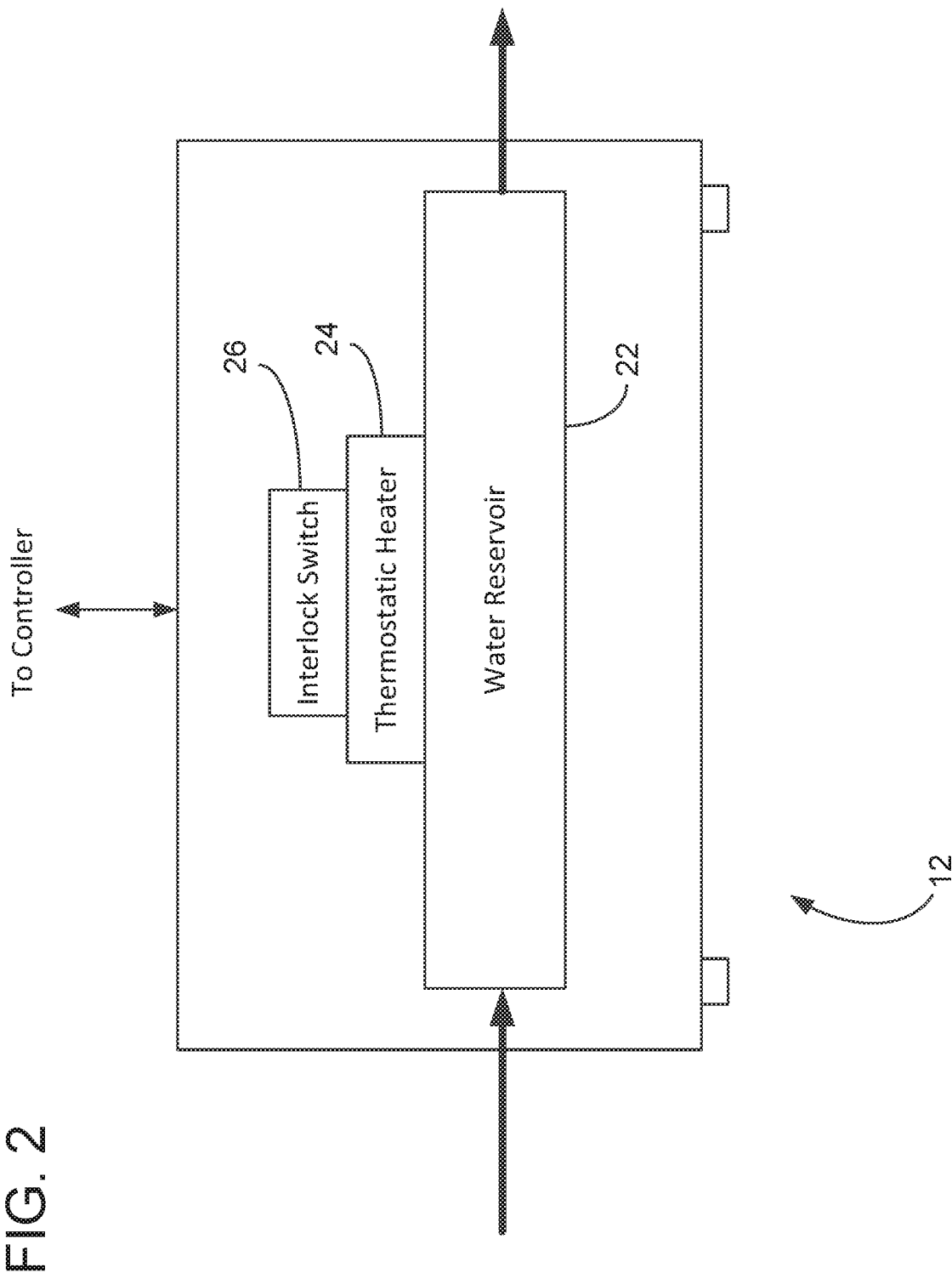
FIG. 2 is an enlarged schematic block diagram of a boiler of the zoned radiant heating system.

Referring to FIG. 2, the illustrated boiler 12 includes a water reservoir 22 and a thermostatic heater 24 thermally coupled to the water reservoir. The water reservoir 22 can be any suitable structure for receiving supply water. For example, in one or more embodiments, the water reservoir 22 comprises a water tank, a water conduit, etc. Suitably, the thermostatic heater 24 comprises a heating element (not shown separately) that is thermally coupled to the reservoir 22 to heat the water. The thermostatic heater 24 is configured to receive heating energy (e.g., gas or electricity) from a heating energy source (not shown) and to convert the heating energy into heat for heating the water in the reservoir 22. Any suitable heating element for heating the water in the reservoir can be used without departing from the scope of the invention. The heater 24 also includes a thermostat (not shown separately) that is configured to sense the temperature of the water and provide feedback control of the heating element whereby the heating element heats the water in the reservoir 22 to a set point temperature.

The illustrated boiler 12 further includes a shutoff switch 26. The shutoff switch 26 is configured to selectively activate and deactivate the boiler 20. In one or more embodiments, when the boiler 20 is activated, the thermostatic heater 24 is connected to a heating energy source such as electrical power or heating fuel for energizing the heating element. In the activated state, the thermostatic heater 24 is operative to maintain the water in the reservoir 22 at the set point temperature. In some embodiments, the heater 24 is disconnected from the heating energy source when it is placed in a deactivated state. For example, a gas valve is shut off or an electrical switch is moved to an off position, etc. In one or more embodiments, the shutoff switch 26 is configured to selectively activate and deactivate the boiler by actuating the gas valve or electrical switch to connect and disconnect the heater 24 from the heating energy source. Other ways of selectively activating and deactivating a boiler can also be used in other embodiments.

Referring again to FIG. 1, the illustrated boiler 12 is operatively connected to the central controller 20 to communicate with the controller. In the illustrated embodiment, the controller 20 is located in the mechanical room MR with the boiler 12. Thus, in the illustrated embodiment, the communications connection between the boiler 12 and the controller 20 is hardwired. In other embodiments, the boiler 12 communicates with the controller 20 using a wireless communications link, such as via a radio frequency connection, a Wi-Fi connection, etc.

The boiler 12 is configured to transmit signals to the controller 20 that are used by the controller to provide centralized control of the radiant heating system 10. In one or more embodiments, the boiler 12 is configured to transmit signals such as a hot water temperature signal representative of a temperature of the water in the reservoir 22 detected by the thermostat of the heater 24. In certain embodiments, the boiler 12 is configured to transmit a boiler activation state signal to the controller representative of whether the boiler 12 is in an activated or deactivated state. For example, when the shutoff switch 26 deactivates the boiler 12, the boiler transmits a deactivation state signal to the controller 20; and when the boiler is activated, it sends an activation signal to the controller. In other embodiments, the controller 20 is solely responsible for controlling the activation state of the boiler 12, such that the controller can determine the activation state of the boiler without receiving a signal from the boiler. The boiler 12 can transmit a signal to the controller 20 periodically, continuously, or only at the occurrence of a boiler state change. The controller 20 can be configured to receive the signals transmitted by the boiler and to use them in a centralized control scheme as described in further detail below.

The controller 20 is likewise configured to transmit control signals to the boiler 12 that control adjustments to the boiler. In suitable embodiments, the controller 20 includes a user interface for receiving user inputs for adjusting a parameter of the boiler 12 and/or other peripheral components of the radiant heating system 10. The user interface, in certain embodiments, comprises a local user interface mounted at the same location as the controller 20 and/or a remote user interface (not shown; e.g., a mobile device, etc.) that is remotely connected to the controller for transmitting a user input to the controller. For example, in one or more embodiments, a user provides a user input to the controller 20 for adjusting the set point temperature of the boiler 12. After receiving the user input, the controller 20 transmits a boiler set point temperature control signal to the boiler 12 configured to adjust the set point temperature of the thermostatic heater 24. The controller 20 is further configured to transmit other boiler control signals to the boiler 12. For example, in the illustrated embodiment, the controller 20 is configured to transmit a boiler deactivation control signal to the boiler 12 as discussed in further detail below. In response to receiving the boiler deactivation control signal, the shutoff switch 26 is configured to automatically switch the boiler 12 into the deactivated state, inhibiting the boiler from drawing heating energy to heat the water in the reservoir tank 22. The controller 20 is also configured to transmit a boiler activation control signal to the boiler 12. When the boiler 12 receives the boiler activation control signal, the shutoff switch 26 automatically switches the boiler to the activated state, allowing the boiler to draw heating energy for heating the water in the reservoir 22. The controller transmits still other boiler control signals to the boiler in other embodiments.

Referring still to FIG. 1, the radiant heating system 10 includes one or more radiators 30 positioned in each environmental zone EZ for heating the respective environmental zone. In the illustrated embodiment, the building B includes three environmental zones EZ. One environmental zone EZ includes two radiators 30 and the other two environmental zones include one radiator each. It will be understood that the radiant heating system can be used with buildings having other numbers of environmental zones or other numbers of radiators in each zone without departing from the scope of the invention. The radiators 30 are selectively coupled to the boiler 12 to receive the hot water from the boiler. The radiators 30 are configured to convey radiant heat from the hot water to the respective environmental zones EZ.

Figure 3:
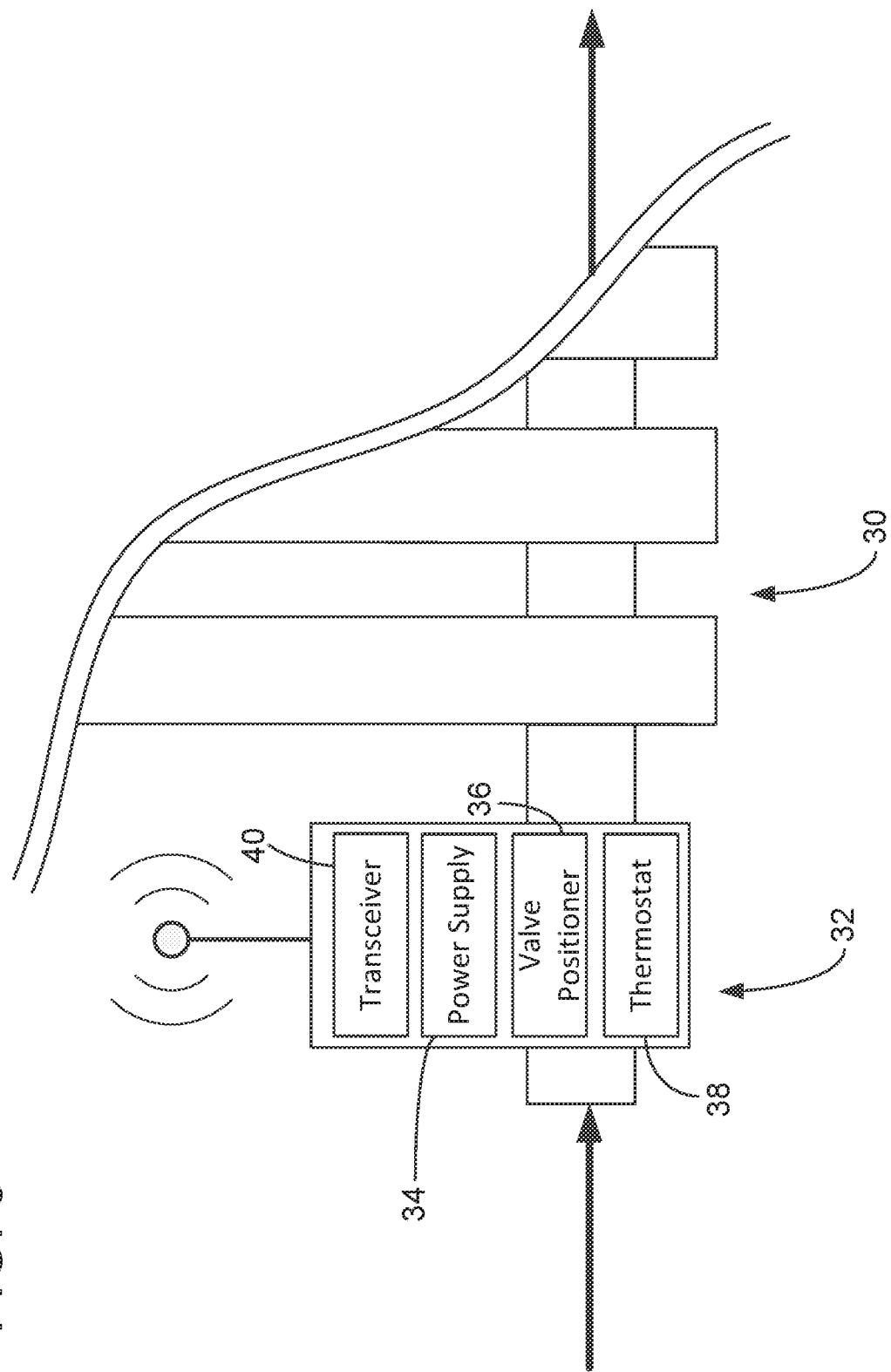
FIG. 3 is an enlarged fragmentary schematic block diagram of a radiator and a radiator valve of the zoned radiant heating system.

Each environmental zone EZ includes at least one thermostatic radiator valve 32 configured to control the amount of hot water from the boiler 12 that is supplied to the radiators 30 in the zone. In the illustrated embodiment, each radiator 30 has its own valve 32, but in other embodiments, a single valve can be used to control the flow of hot water to more than one radiator in a respective environmental zone EZ. Referring to FIG. 3, each of the illustrated radiator valves 32 is an electronic thermostatic radiator valve.

The radiator valve 32 includes a power supply 34 that is operatively connected to an electronic valve positioner 36. The valve positioner 36 is configured to selectively adjust to the position of a valve body to open and close the radiator valve 32. For example, in one embodiment, the valve positioner 36 comprises an electric motor and the power supply 34 comprises a battery. The electric motor (valve positioner 36) draws power from the battery (power supply 34), which drives the motor to adjust the position of the valve body to open and close the valve 32. In certain embodiments, the valve positioner 36 operates in a binary manner. That is, the valve positioner 36 is configured to position the valve in one of a fully opened position or a fully closed position. In other embodiments the valve positioner 36 is configured for fine adjustments of the valve position. For example, the valve positioner 36 can adjust the valve to a fully opened position, a fully closed positioned, and one or more positions between the fully opened position and fully closed position. One skilled in the art will appreciate that controlling when and the extent to which the radiator valve 32 is opened controls the supply of hot water to the radiator 30 and thus the temperature of the respective environmental zone EZ.

The electronic thermostatic radiator valve 32 is configured to locally maintain the temperature of the respective environmental zone EZ at a set point temperature. The radiator valve 32 includes a thermostat 38 that is configured to sense the temperature of the respective environmental zone EZ at the radiator valve and provide feedback control of the valve positioner 36. For example, when the thermostat 38 detects a temperature in the environmental zone EZ that is below the set point temperature, the thermostat controls the valve positioner 36 to open the valve 32 and allow more hot water to flow through the radiator 30. When the thermostat 38 detects a temperature in the environmental zone EZ that is at or above the set point, it controls the valve positioner 36 to close the valve 32 and restrict or prevent the flow of additional hot water into the radiator 30. By selectively controlling the flow of hot water from the boiler 12 into and through the radiator 30, the thermostat 38 can maintain the environmental zone at about a predetermined set point temperature.

Each electronic thermostatic radiator valve 32 is operatively connected to the central controller 20 to communicate with the controller. In the illustrated embodiment, the controller 20 is located in the mechanical room MR remote from at least some of the radiator valves 32 in the respective environmental zones EZ. To lower the cost of setting up the radiant heating system 10, in certain embodiments, a wireless communications protocol is used to establish a connection between the radiator valves 32 and the controller 20. The illustrated radiator valve 32 therefore includes a wireless transceiver 40 for exchanging signals with the controller 20. In a suitable embodiment, the transceiver 40 communications with the controller 20 using an RF connection, but other types of wireless connections (e.g., Wi-Fi, etc.) or a wired connection can also be used in other embodiments.

Each radiator valve 32 is configured to transmit signals to the controller 20 that are used in the centralized control scheme for the radiant heating system 10. In one or more embodiments, each radiator valve 32 is configured to transmit a radiator demand signal to the controller 20 representative of the respective radiator's demand for hot water from the boiler 12, which is broadly indicative of the radiator's demand on the system 10. For example, when a radiator valve 32 is closed, the respective radiator 30 has zero demand on the system 10, so the transceiver 40 transmits a zero demand signal to the controller 20. When the radiator valve 32 is partially or fully opened, however, the demand of the radiator 30 for hot water increases, and the transceiver 40 transmits a non-zero demand signal to the controller 20. In one or more embodiments, the non-zero demand signal varies with the amount of demand that the radiator 30 is placing on the system 10. The transceiver 40 can transmit the radiator demand signal to the controller 20 periodically, continuously, or only at the occurrence of a radiator demand change. Radiator demand changes with valve position, and thus a valve position signal can be used as a radiator demand signal. The radiator valve 32 can also be configured to transmit other signals to the controller 20, such as an environmental temperature signal representative of a temperature of the respective environmental zone EZ detected by the thermostat 38. The controller 20 is configured to receive the signals transmitted by the transceiver 40 and to use them in a centralized control scheme as described in further detail below.

In addition, the controller 20 is configured to transmit control signals to the radiator valve 32 that are used to make adjustments to the valve. As explained above, the controller 20 includes a user interface for receiving user inputs. A user can provide a user input to the controller 20 for adjusting the set point temperature of a specified environmental zone EZ. After receiving the user input, the controller 20 transmits an environmental zone set point temperature control signal to the transceiver 40, and the electronic radiator valve 32 adjusts the set point temperature of the thermostat 38. It is also understood that, in some embodiments, the electronic thermostatic radiator valve 32 has a local user interface (not shown) for adjusting the environmental set point temperature. In the illustrated embodiment, the controller 20 is configured to transmit other radiator valve control signals to the electronic radiator valve 32 in addition to set point temperature controls. For example, the controller 20 is configured to transmit a valve positioner deactivation control signal to the thermostatic radiator valve 32 as discussed in further detail below. In response to receiving the valve positioner deactivation control signal, the radiator valve 32 is configured to deactivate the valve positioner 36 such that valve positioner is inhibited from drawing power from the power supply 34 for adjusting the position of the valve. The controller 20 is also configured to transmit a valve positioner activation control signal to the radiator valve 32. In response to receiving the valve positioner activation control signal from the controller 20, the valve 32 is configured to activate the valve positioner 36 whereby the valve positioner is enabled to selectively draw power from the power supply 34 to selectively open and close the valve.

Referring again to FIG. 1, the illustrated heating system 10 further includes domestic hot water supply valves 50 that are fluidly connected to the boiler 12 to receive hot water from the boiler. It is understood that the heating system 10 could be used separately from the domestic hot water supply system of a building B in other embodiments. As is known in the art, each domestic hot water supply valve 50 is configured to control the supply of hot water from the boiler 12 to one or more water fixtures (not shown) in a respective domestic hot water zone DHZ within the building B. The domestic hot water supply valves 50 are operatively connected to the system controller 20 to communication with the controller. In the illustrated embodiment, the domestic hot water supply valves 50 are connected to the controller 20 wirelessly by an RF connection. In other embodiments, the domestic hot water supply valves are connected using other types of connections.

Suitably, the domestic hot water supply valves are configured to transmit a domestic hot water demand signal to the controller 20 representative of the demand from the respective domestic hot water zone DHZ for hot water from the boiler 12. For example, when a domestic hot water valve 50 is closed, the respective domestic hot water zone DHZ has zero demand on the system 10, so the valve 50 transmits a zero domestic hot water demand signal to the controller 20. When the valve 50 is partially or fully opened, however, the demand from the domestic hot water zone DHZ is increased and the valve 50 transmits a non-zero domestic hot water demand signal to the controller 20. The valve 50 can transmit the domestic hot water demand signal to the controller 20 periodically, continuously, or only at the occurrence of a demand change. The controller 20 is configured to receive the signals transmitted by the valves 50 and to use them in a centralized control scheme as described in further detail below. The domestic hot water valve 50 can also be configured to transmit other signals to the controller 20, and the controller 20 can be configured to transmit control signals to the domestic hot water valves.

A suitable method of using the radiant heating system 10 will now be described. Initially, the components of the system 10 must be installed in the building B. In a typical installation, the building B will have a preexisting boiler 12, radiators 30, and plumbing connecting the boilers to the radiators. The radiators 30 may be operatively connected to non-electronic thermostatic radiator valves. To implement the system 10 in the building B, the installer mounts the controller 20 at a suitable location within the building (typically, in the mechanical room MR with the boiler 12) and connects the controller to the boiler 12. If the existing boiler 12 does not have a shutoff switch 26, one can be installed or the boiler 12 can be replaced with a new boiler that is fitted with a shutoff switch. The installer replaces each of the non-electronic thermostatic radiator valves in the preexisting system with the electronic thermostatic radiator valves 32 and establishes a wireless connection between each valve and the controller 20. Likewise, if applicable, the installer installs the domestic hot water valves 50 and establishes a wireless connection with the controller 20.

Once the necessary connections have been made, the user or installer can set the control parameters for the system 10. In general, the controller 20 will be installed with preset default control parameters, but these can be adjusted to suit a particular user's desires. Among other control parameters, the system 10 allows the user to select a desired environmental set point temperature for each environmental zone EZ and to define low and high usage times at which the system automatically adjusts the amount of energy it is using to provide heating. Using the user interface for the controller 20, the user can provide user inputs that set the desired environmental set point temperature for each environmental zone EZ. The user can also use a user interface local to the respective radiator valve 32 to set and adjust the environmental set point temperature for the respective environmental zone EZ in some embodiments. The user can further provide user inputs the user interface associated with the controller 20 to set the low and high usage times for the system. For example, if there are standard hours during which no person is typically present in the building B or all people present in the building are asleep, the user can set these times to be low usage and set all other times to high usage. As explained below, the controller 20 automatically adjusts the system 10 to use less energy during the low usage times and to provide optimal heating during high usage times.

After the system 10 is set up, the controller 20 and the electronic thermostatic radiator valves 32 automatically control the heating of the environmental zones EZ. During high usage times, the controller 20 allows the boiler 12 to operate in an activated state. The thermostats 38 control the valve positioners 36 to open and close the radiator valves 32 and selectively convey hot water from the boiler 12 to the respective radiator 30. When additional heat is required in an environmental zone EZ, the radiator valve(s) 32 in the zone opens. Thus, the respective radiator(s) place a non-zero or positive radiator demand on the system 10. The boiler 12 feeds hot water to the respective radiator 30 through the open valve 32. When the temperature in the environmental zone EZ is at or above the set point temperature, the valve 32 closes. With the valve 32 closed, the radiator 30 places zero radiator demand on the system 10. Meanwhile, as domestic hot water is needed in each domestic hot water zone DHW, the domestic hot water valves 50 open and place domestic hot water demand on the system 10. In the activated state, the boiler 12 meets all of the radiator demand and domestic hot water demand as it is placed on the system 10.

Figure 4:
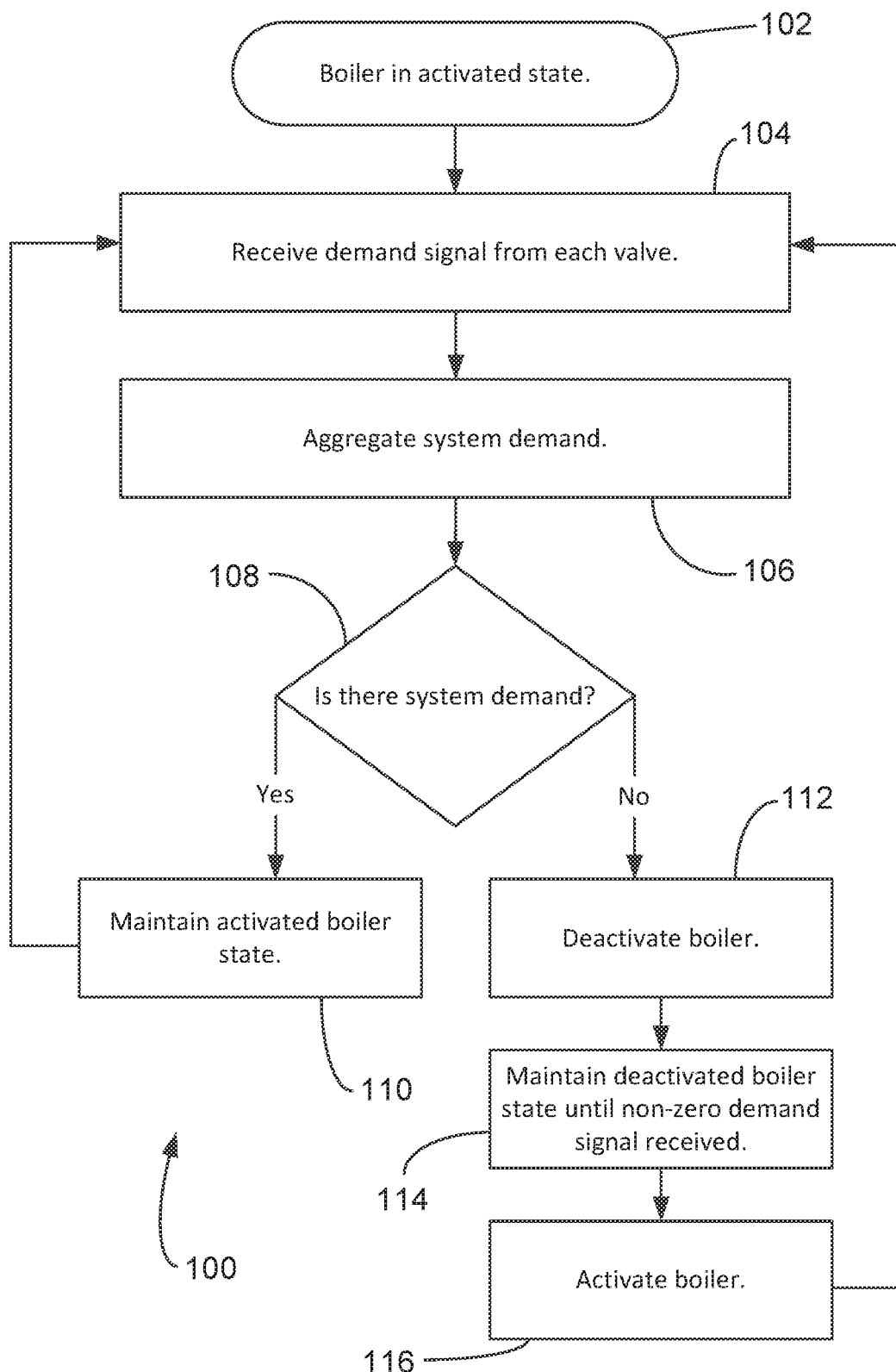
FIG. 4 is a flow chart illustrating the steps and decision blocks of a method of operating the radiant heating system to conserve energy.

Referring to FIG. 4, the controller 20 is configured to selectively deactivate the boiler 12, even during high usage times, to minimize the total energy usage of the system 10. In an exemplary method 100, the boiler 12 begins in an activated state (starting block 102). The boiler shutoff switch 26 is turned on so that the boiler 12 can draw heating energy to heat the water in the reservoir 22. With the boiler in the activated state, at step 104, the controller 20 receives a demand signal from each of the radiator valves 32 and domestic hot water valves 50 (if applicable). At step 106, the controller aggregates the demand signals to determine the total aggregate demand on the system 10. Based on the aggregated system demand determined in step 106, at decision block 108, the controller determines whether there is any aggregated system demand.

In the illustrated embodiment, when the demand signal for each of the valves 32, 50 is a zero demand signal, the controller 20 determines that the total aggregated demand on the system 10 is zero. When the demand signal for at least one of the valves 32, 50 is non-zero, the controller 20 determines that the aggregated system demand is non-zero. It will be understood that other signals representative of demand for hot water can be combined with the signals from the radiator valves 32 and domestic hot water valves 50. For example, in one or more embodiments, each environmental zone can include one or more room sensors (not shown) (e.g., environmental temperature sensors, etc.), and the controller 20 can be configured to evaluate the aggregated system demand using these additional signals. Still other signals representative of sources of demand for hot water can be used in to determine aggregated system demand.

After determining that there is non-zero demand on the system 10, the controller 20 maintains the boiler 12 in the activated state (step 110). But when the controller 20 determines that the aggregated system demand is zero, at step 112, the controller 20 deactivates the boiler 12. More specifically, the controller 20 transmits a deactivation control signal to the boiler 12 that causes the shutoff switch 26 to switch to the off position. In the off position, the shutoff switch 26 prevents the boiler 12 from drawing heating energy to heat the water in the reservoir 12. After deactivating the boiler 12, the controller 20 operates the system 10 with the boiler 12 in the deactivated state until it receives a non-zero demand signal from one of the valves 32, 50 (step 114). When one of the valves 32, 50 opens, the controller 20 receives a non-zero demand signal from the valve and at step 116 activates the boiler. As shown in FIG. 4, any time the boiler is activated, the method 100 proceeds to step 102 such that the controller continues to receive demand signals from the valves 32, 50 when the boiler 12 is activated.

As can be seen, the method 100 provides an automated process for minimizing total energy use and thus maximizing the energy efficiency of the system 10. The controller 20 creates an interlock between the valves 32, 50 and the boiler shutoff switch that automatically shuts the boiler 12 off when there is no system demand for hot water. Energy use is minimized by prohibiting the boiler 12 from drawing heating energy when the aggregate system demand is zero. Because of the communication connections between the valves 32, 50 and the controller 20, the controller is able to evaluate aggregate system demand and make immediate adjustments to the boiler to ensure it both is available when system demand is present and does not draw unnecessary energy when there is zero aggregate system demand.

Referring to FIGS. 1 and 3, the system 100 is further configured to operate the electronic thermostatic radiator valves 32 in an energy efficient manner. As discussed above, during certain predefined low use times, the controller 20 is configured to deactivate the boiler 12. While the boiler 12 is deactivated, any valve activity wastes power from the power supply 34 because opening and closing the valve 32 has a negligible heating effect on the respective environmental zone EZ when the boiler is not producing hot water. However, since radiator valves operate based on local thermostatic control regardless of the activation state of the boiler, in a conventional system the local thermostat would continue to control the valve positioner based on the detected local temperature and the valve positioner would continue to draw power from the power supply to open and close the valve.

Unlike a conventional electronic radiant heating system, in the illustrated heating system 10, the controller 20 is configured to deactivate the radiator valves 32 whenever the boiler 12 is deactivated. In general, the controller 20 functions to determine the activation state of the boiler 12. In the illustrated embodiment, the controller 20 directly controls the position of the shutoff switch 26 and thus is intrinsically aware of the activation state of the boiler 12 (i.e., whether the shutoff switch is switched on or off). In other embodiments, the controller 20 receives activation state signals from the boiler 12 and determines the activation state of the boiler based on the received signals. In either instance, when the controller 20 determines that the boiler 12 has been deactivated, it transmits a deactivation control signal to each of the radiator valves 32. In response, each valve 32 deactivates the valve positioner 36 such that the valve positioner is prevented from drawing power from the power supply 34 to adjust the position of the valve. In one embodiment, the valve 32 simply maintains its current valve position after receiving the valve deactivation signal. In another embodiment, the valve positioner 36 fully closes any open valve 32 and subsequently maintains the valve in the closed state. In either case, after receiving the valve deactivation signal from the controller 20, the valve positioner 36 is prevented from drawing power from the power supply while the boiler 12 is deactivated.

After the low usage period has expired, the controller 20 switches the shutoff switch 26 back to the on position to activate the boiler 12. In response, the controller 20 sends a valve activation signal to each of the radiator valves 32. When the radiator valves 32 receive the valve activation signals, they activate the valve positioners 36, allowing the valve positioners to draw power from the power supplies 34 to open and close the valves. After a valve 32 is reactivated, the thermostat 38 reconvenes local control of the valve positioner 36 to maintain the environmental zone at the desired set point temperature.

As can be seen, the illustrated system is configured to minimize the amount of power that is drawn from the valve power supplies 34 when hot water is not being produced. Since the power supplies 34 are typically batteries that must be periodically recharged or replaced, minimizing the rate at which the power is drawn down helps maximize the total life of the batteries. Maximizing battery life makes replacements and/or recharges less frequent, which lowers cost and makes the system 10 more user friendly.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A heating fluid control system for a building comprising a boiler configured to heat water and sources of demand configured to use hot water from the boiler, the sources of demand including at least one radiator in each of a plurality of zones of the building configured to radiantly heat the respective zone using heat of the hot water, the sources of demand further including a domestic hot water fixture, the heating fluid control system comprising:
- at least one radiator valve for each of the plurality of zones, each radiator valve being fluidly connected between the boiler and a radiator in the respective zone and being selectively openable and closable to control the hot water that is supplied to the respective radiator from the boiler, each radiator valve being further configured to transmit a radiator demand signal representative of a demand of the respective radiator for the hot water;
- at least one domestic hot water valve fluidly connected between the boiler and the domestic hot water fixture and selectively openable and closable to control the hot water that is supplied to the domestic hot water fixture, the at least one domestic hot water valve configured to transmit a hot water demand signal representative of a demand of the domestic hot water fixture for the hot water; and
- a controller operatively connected to the boiler and to each of the radiator valves to receive the respective radiator demand signal and to the at least one domestic hot water valve to receive the hot water demand signal, the controller being configured to determine, based at least in part on the radiator demand signals for each of the radiator valves, when a demand for hot water from the sources of demand of the building is zero and to transmit a boiler deactivation control signal to the boiler when the demand for hot water from the sources of demand is determined to be zero, the boiler deactivation control signal being configured to automatically deactivate the boiler when the boiler receives the boiler deactivation signal;
- wherein the controller is configured to determine that the demand for hot water from the sources of demand is zero when the radiator demand signal of each of the radiator valves and the domestic hot water demand signal of the at least one domestic hot water valve represent zero demand from the respective source of demand; and
- wherein the controller is further configured to deactivate each of the radiator valves when the boiler is deactivated.

2. The heating fluid control system as set forth in claim 1 wherein each radiator valve is configured to transmit a zero radiator demand signal when the radiator valve is closed and is configured to transmit a non-zero radiator demand signal when the radiator valve is open.

3. The heating fluid control system as set forth in claim 2 wherein the controller is configured to determine that the demand for hot water from the sources of demand is zero only when the controller receives the zero radiator demand signal from each of the radiator valves.

4. The heating fluid control system as set forth in claim 2 wherein the controller is configured to transmit a boiler activation control signal to the boiler when the controller receives a non-zero radiator demand signal from any of the radiator valves while the boiler is deactivated.

5. The heating fluid control system as set forth in claim 4 wherein the boiler activation control signal is configured to automatically activate the boiler.

6. The heating fluid control system as set forth in claim 5 wherein the boiler deactivation control signal is configured to automatically switch a boiler shutoff switch to an off position in which the shutoff switch disconnects the boiler from a heating power source and the boiler activation control signal is configured to automatically switch the boiler shutoff switch to an on position in which the shutoff switch operatively connects the boiler to the heating power source.

7. The heating fluid control system as set forth in claim 1 wherein the domestic hot water valve is configured to transmit the domestic hot water demand signal to the controller.

8. The heating fluid control system as set forth in claim 7 wherein the controller is configured to use the domestic hot water demand signal to determine when the demand for hot water from the sources of demand is zero.

9. The heating fluid control system as set forth in claim 1 wherein the controller is operatively connected to at least one of the radiator valves by a wireless communications link.

10. The heating fluid control system as set forth in claim 1 wherein controller is further configured to transmit a radiator valve deactivation control signal to each of the radiator valves of the heating fluid control system at the onset of a predefined low usage time interval.

11. The heating fluid control system as set forth in claim 10 wherein each radiator valve deactivation control signal is configured to automatically deactivate the respective radiator valve to limit activity of the respective radiator valve during the low usage time interval.

12. The heating fluid control system as set forth in claim 1 further comprising said boiler.

13. The heating fluid control system as set forth in claim 12 wherein the boiler is located remote from at least one of the radiator valves.

14. A method of providing separately controlled heating of a plurality of zones in a building, the method comprising:
- receiving a radiator demand signal provided by at least one source of demand for each of the plurality of zones, the at least one source of demand providing the radiator demand signal comprising a radiator, each radiator demand signal representing a demand of the radiator for hot water in the respective zone;
- receiving a domestic hot water demand signal from at least one other source of demand, the at least one other source of demand providing the domestic hot water demand signal comprising a domestic hot water fixture, each domestic hot water demand signal representing a demand of the domestic hot water fixture for hot water;
- combining the demand signals to determine an aggregated hot water demand having one of a zero value representative of zero hot water demand and a non-zero representative of non-zero hot water demand;
- selectively deactivating the boiler when the aggregated hot water demand is determined to have a zero value, wherein the aggregated hot water demand is determined to have a zero value when each radiator demand signal and the domestic hot water demand signal represent zero demand from the respective source of demand; and
- deactivating each of the sources of demand when the boiler is deactivated.

15. The method as set forth in claim 14 further comprising, after deactivating the boiler, activating the boiler when the aggregated hot water demand is determined to have a non-zero value.

16. The method as set forth in claim 14 wherein the step of deactivating the boiler comprises disconnecting the boiler from a power source from which the boiler draws power to heat the heating fluid.

17. The method as set forth in claim 14 wherein the step of receiving a demand signal comprises receiving a valve condition signal from a radiator valve in each of the plurality of zones representing whether the radiator valve is open or closed.

18. A heating fluid control system for a building comprising a boiler configured draw power from a power source to heat heating fluid and a plurality of sources of demand configured to use the heating fluid from the boiler, the sources of demand including at least one radiator in each of a plurality of zones of the building configured to radiantly heat the respective zone using heat of the heating fluid, the sources of demand further including a domestic hot water fixture, the heating fluid control system comprising:

a plurality of valves fluidly connected between the boiler and the plurality of sources of demand, each of the valves being selectively openable and closable to control the heating fluid that is supplied from the boiler to at least one of the respective sources of demand, each of the valves being further configured to transmit a valve condition signal representing whether the valve is open or closed;

a controller operatively connected to each of the valves to receive the respective valve condition signal and configured to determine based at least in part on the received valve condition signals when the heating fluid control system has zero aggregate demand for heating fluid, the controller being further configured to automatically adjust the boiler to limit the power drawn from the power source when the controller determines that the heating fluid control system has zero aggregate demand for heating fluid;

wherein the aggregate demand for heating fluid is determined to have a zero value when each received valve condition signals represent the respective valve is closed indicating zero demand from the respective source of demand; and wherein the controller is further configured to deactivate each of the valves when the boiler is deactivated.

\* \* \* \* \*